June 22, 1926.
R. H. COSGROVE
FOLDING SEAT LOCK
Filed July 15, 1924
1,589,460
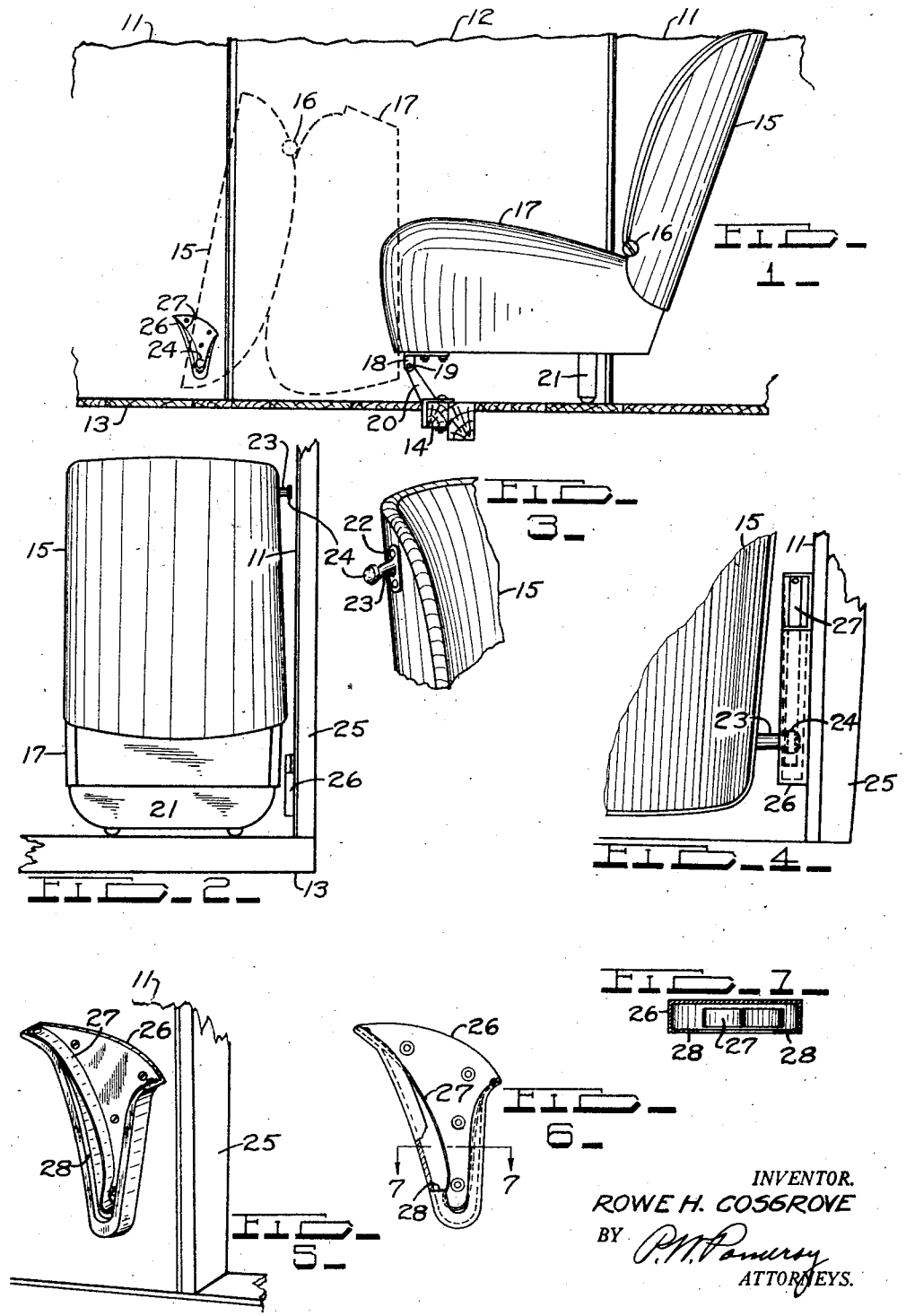
INVENTOR.
ROWE H. COSGROVE
BY
ATTORNEYS.

Patented June 22, 1926.

1,589,460

UNITED STATES PATENT OFFICE.

ROWE H. COSGROVE, OF DETROIT, MICHIGAN, ASSIGNOR TO THE STUDEBAKER CORPORATION, OF SOUTH BEND, INDIANA, AND DETROIT, MICHIGAN, A CORPORATION OF NEW JERSEY.

FOLDING-SEAT LOCK.

Application filed July 15, 1924. Serial No. 726,207.

This invention relates to automobiles and particularly to those having folding seats, and the principal object is to provide means for holding such seats in folded position and to prevent bouncing and rattling of the same.

Another object is to provide a folding seat with means for engaging a resilient socket member carried by the body of the automobile.

A further object is to provide an automobile body having a seat provided with a folding back and bottom, a knob secured to the back of the seat and a socket member secured to the automobile body, said socket member having a resilient gripping part therein adapted to receive the knob on the back of the seat when the seat is in folded position.

The above being among the objects of the present invention, the same consists of certain features of construction and combination of parts to be hereinafter described with reference to the accompanying drawing and then claimed, having the above and other objects in view.

In the drawing which illustrates a suitable embodiment of the present invention, and in which like numerals refer to like parts throughout the several different views, Figure 1 is a fragmentary sectional view taken longitudinally through the center of an automobile in which the present invention is embodied, showing the folding seat in open position in full lines and in closed position by dotted lines.

Figure 2 is a rear view of the seat shown in Figure 1 and fragments of the co-operating portions of the automobile body.

Figure 3 is a perspective view of the corner of the seat back to which is secured the knob forming part of the present invention.

Figure 4 is a fragmentary view from the rear of the seat showing the relative positions of the knob and socket member when in engagement with each other.

Figure 5 is a fragmentary perspective view showing the socket member mounted on the automobile body.

Figure 6 is a side view of the socket member.

Figure 7 is an enlarged section of the socket member taken on the line 7—7 of Figure 6.

In automobiles equipped with the so-called "coach" type bodies in which there are two rows of seats and but one door on each side of the body, it is usually necessary to provide means for moving the front seat on the side opposite the driver's seat out of the way to permit ingress or egress of the passengers to or from the rear seats through the door which is usually in line with the front seats. It is the conventional practice to provide such seats with a pivoted back and to pivot the bottom of the seat on brackets at its forward end, allowing the back to be folded over the bottom and to pivot the whole as a unit forwardly about the bottom pivots to a position adjacent the front edge of the door, thereby allowing sufficient room therebehind for the ingress of passengers to or egress from the rear seats. The present invention relates to means for holding such seats in folded position in such a manner as to prevent bouncing or rattling of the same.

In the accompanying drawing is shown an automobile body having sides 11, a door 12, floor 13 and body frame cross member 14. In accordance with this invention a folding seat is shown comprising a back 15 pivoted at 16 to a seat bottom 17. Secured to the bottom of the seat 17, at the forward edge thereof are two brackets 18, one only of which is apparent in the side view, disposed equally on each side of the center of the seat. The brackets 18 are pivoted at 19 to the upwardly projecting arms of the brackets 20 bolted to the body frame cross member 14. Secured to the under side of the seat bottom 17 adjacent the rear edge thereof is a leg 21 for holding the seat in proper elevated position when in use. From such construction it is readily apparent that the back 15 may be folded down over the bottom 17 about the pivot point 16, and then both the back 15 and bottom 17 may be pivoted forwardly about the point 19 to a position adjacent the front edge of the door 12, thus providing sufficient space therebehind for the passengers passing through the door 12 to or from the seats in the rear.

To hold the seat in the desired folded position, a plate member 22 is secured to the side of the seat back 15 adjacent the upper and outer edge thereof as shown particularly well in Figure 3. The plate 22 is secured to the seat back 15 by screws or other suitable means and is provided with a projecting shank 23 terminating in a knob 24. Secured to body 11 adjacent the forward edge of the door 12, preferably to the door post 25 which is situated at that point, and relatively close to the floor 13 is a socket member comprising the casing 26 and spring 27. The casing 26 is preferably U shaped with the upper edge of the U flared outwardly to better guide the knob 24 thereinto and is provided with an inwardly turned outer edge 28. The spring 27 may be of strip material bent somewhat U shaped to lie behind the inwardly turned flange 28 of the casing 26 for the greater portion of its length and its free ends are secured by rivets or other suitable means to the casing 26 at the upper outwardly flared edges thereof, the spring 27 being otherwise spaced from the edges of the casing 26 throughout its length. It will be noted that the bottom of the U of the spring 27 is of greater width than the portion immediately above it, thereby providing a constricted portion through which the knob 24 must pass before it reaches the bottom of the U which itself is normally enough smaller than the knob 24 to be spread by engagement therewith and constantly exert a pressure thereon. The constricted portion above the bottom is such as to prevent the knob 24 from pulling out of the bottom of the spring 27 due to any tendency of the seat to bounce.

It will be evident that when the seat is folded forward, the knob 24 enters the casing 26 and passing through the constricted portion of the spring 27 resiliently engages the bottom of the latter. When in this position the knob 24 hangs in the spring 27 and carries approximately half of the weight of the seat in such a manner as to prevent any bouncing or rattling of the same.

Although I have shown but one adaptation of the present invention in the accompanying drawing, it is evident that it may be adapted to meet a variety of conditions and applications, and formal changes may be made in the specific embodiment of the invention described without departing from the spirit and substance of the broad invention, the scope of which is commensurate with the appended claims.

What I claim is:—

1. In combination, an automobile body having a door post and a floor, a seat pivotally supported on said floor, a back pivotally supported on said seat, a projecting knob secured to said back, and a socket member secured to said door post having a resilient member therein to engage said knob when said back is folded over on said seat and said seat and said back are rotated forwardly as a unit about the pivotal axis of said seat to thereby secure said back against said seat and secure said seat and back against vertical movement.

2. In an automobile body, the combination of a seat having a bottom pivotally supported on the body floor and a back pivoted to said bottom, a projecting knob secured to the side of said back, a socket member secured to the side of said body and adapted to receive said knob and support said seat against movement when said bottom is swung forwardly and said back is folded on said bottom, said socket member comprising a casing having divergent edge portions and a U shaped spring supported at its ends in said socket, said spring having a knob receiving portion at its inner end and a constricted passage adjacent thereto to prevent movement of said knob when inserted in said socket.

3. In combination, an automobile body having a floor, a seat pivotally supported on said floor, a back pivotally supported on said seat, a projecting knob secured adjacent the top of said back, a socket member secured to said body adjacent said floor to engage said knob when said back is folded on said seat and said seat and back are rotated as a unit about the pivotal axis of said seat to thereby secure said seat and back against movement.

Signed by me at Detroit, Michigan, U. S. A., this 8th day of July, 1924.

ROWE H. COSGROVE.